July 12, 1955            J. R. ABELSKAMP            2,712,807
REUSABLE GRAINFEEDER FOR OCEAN-GOING SHIPS
Filed Dec. 5, 1952            2 Sheets-Sheet 1
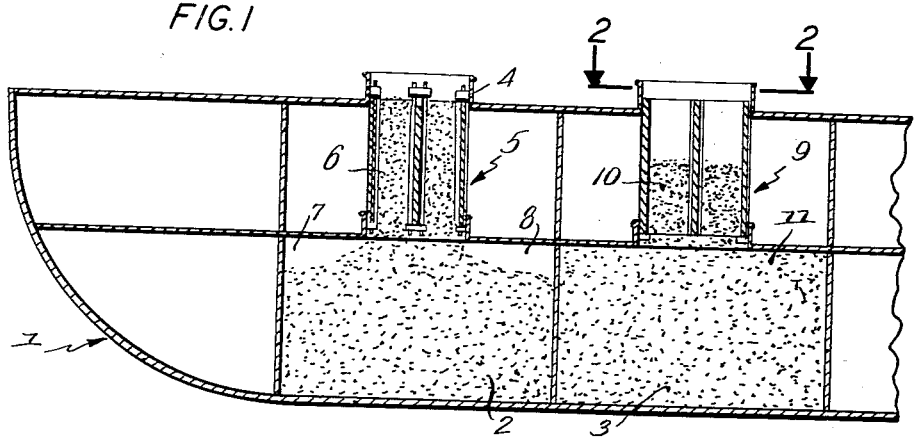
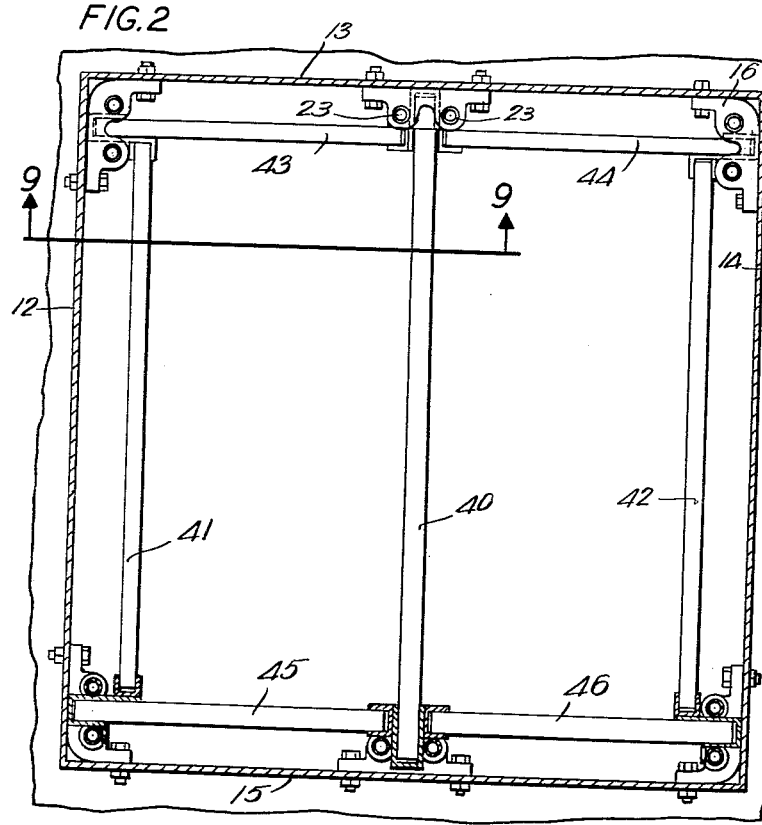
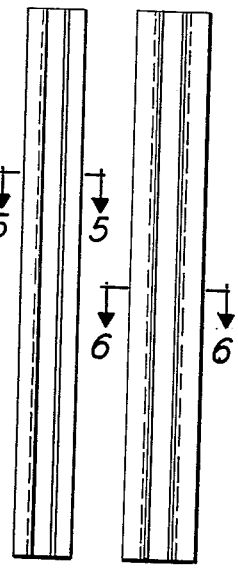
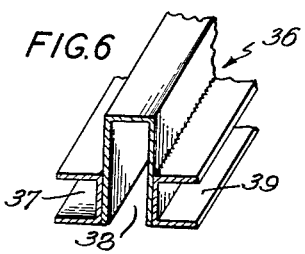
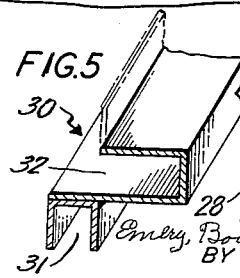
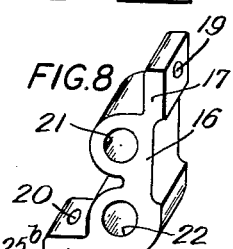
INVENTOR
JOHANNES REINIER ABELSKAMP
BY Emery, Booth, Townsend, Miller and Weidner
ATT'YS.

July 12, 1955    J. R. ABELSKAMP    2,712,807
REUSABLE GRAINFEEDER FOR OCEAN-GOING SHIPS
Filed Dec. 5, 1952    2 Sheets-Sheet 2
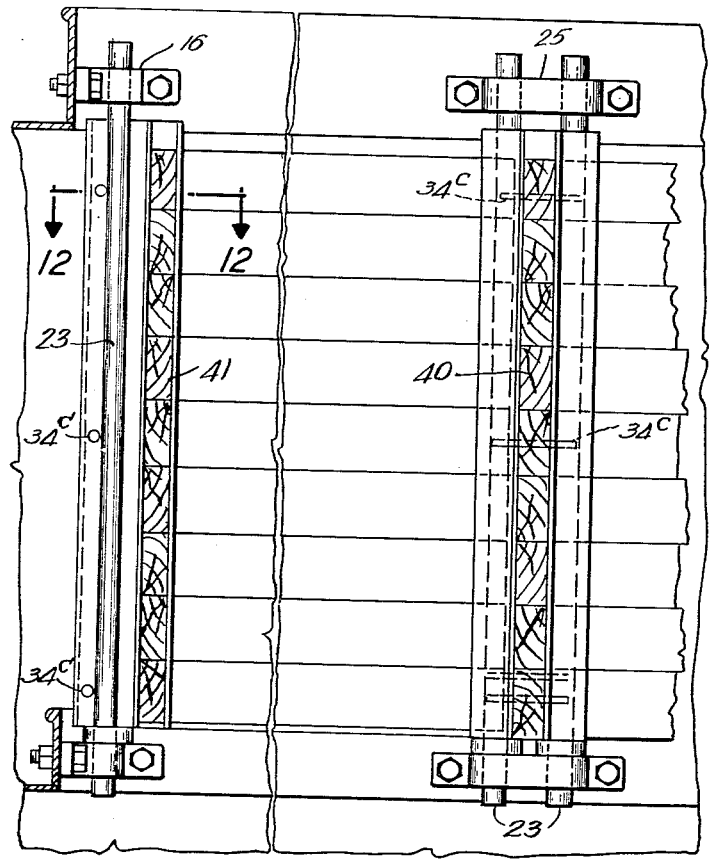
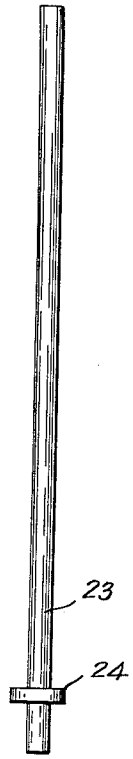
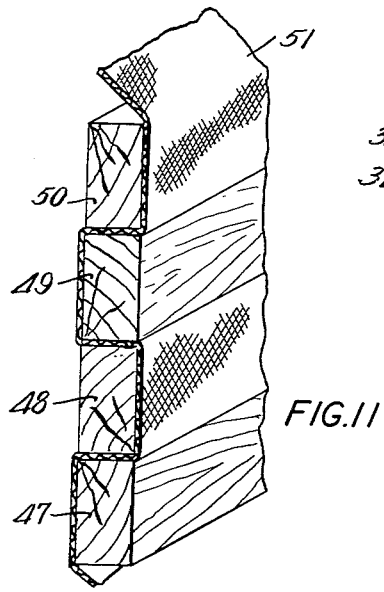
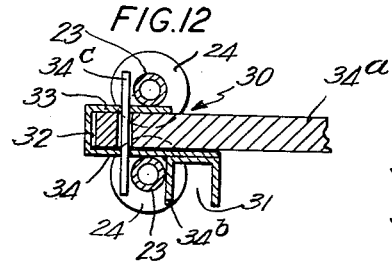
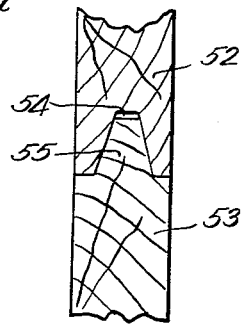
INVENTOR
JOHANNES REINIER ABELSKAMP

United States Patent Office 2,712,807
Patented July 12, 1955

2,712,807
REUSABLE GRAINFEEDER FOR OCEAN-GOING SHIPS

Johannes Reinier Abelskamp, Rotterdam, Netherlands

Application December 5, 1952, Serial No. 324,378

17 Claims. (Cl. 114—75)

This invention relates to reusable grainfeeders for ocean-going ships.

In order that the principle of the invention may be readily understood, I have disclosed a single embodiment thereof in the accompanying drawings.

The purpose of a grainfeeder on an ocean-going ship is to feed grain to the lower hold thereof when therein slack occurs or space appears at any place therein by reason of the grain in the hold settling after the ship rolls or pitches. Normally a grainfeeder is merely an oblong wooden box built to specifications of the "Board of Underwriters." These specifications are quite severe, as grain, of course, has a static pressure like water. Especially heavy strain occurs when the ship is rolling. Apart from double planking, heavy uprights of 6″ x 8″ have to be used, etc. It is a very costly matter to make such grainfeeders, as it causes delay in the ship's sailings and moreover the price of such a grainfeeder is from $700 to $2500 because they must very frequently be built and installed on Saturdays and Sundays, when "double time" must be paid. Such a grainfeeder can be used only once, as, after the discharge of the cargo, usually some other commodity has to be loaded into the ship and therefore such grainfeeder is knocked apart, removed, and discarded, as it is in the way. Such a grainfeeder cannot be used again. At least several hundred thousand dollars are in effect thrown away or lost each year by such proceedings by an average shipping company.

The grainfeeder of my invention, on the contrary, is capable of being put together in a few hours by the crew, while after discharge of the grain cargo, it can be taken apart in an hour and stacked in the side of the ship for reusing. Every part thereof can be readily handled manually.

In that embodiment of my invention herein disclosed, which will be specifically described with reference to the accompanying drawings, in each grainfeeder upon a ship, each of the four corner stanchions, and each of the two center stanchions which are preferably provided, is built up from three pieces, namely, two upright tubes or pipes of steel or other suitable metal and a steel "profile" or suitably vertically channeled upright beam or member positioned or supported in between said two pipes, and hereinafter fully described. Because there are three pieces only, constituting each stanchion, the assembling of the grainfeeder can be readily accomplished manually in a very short time, and such grainfeeder is strong enough to comply with the specifications of the Board of Underwriters. Each "profile" or upright beam or member is of such a shape, as hereinafter fully described, that 2½″ thick boards can be built up, one above another, in edgewise position, with their ends received in the channel formations of such profiles. In this way each of the four walls of each grainfeeder is built up. The part of the profile or member that fits in between the steel pipes or tubes, to constitute each stanchion, is provided with holes in it at suitable places, through each of which a short metal rod can be positioned and also through corresponding holes in the ends of certain of the said thick boards to hold the entire frame in place while rigging up the grainfeeder. At their lower ends these steel tubes or pipes rest in pairs on a small removable steel rest or block, and they are held at their tops by a similar rest for each pair of pipes or tubes. These rests are removable as well as the pipes or tubes and the profiles, so as not to damage the general cargo that may be shipped later on.

With my invention, outside shores are not necessary, as the grainfeeder of my invention when filled with grain causes the pressure of the grain to come on the wooden boards of the grainfeeder and on the profiles and so against the metallic tubes or pipes. Thus the wooden boards act as baffles. The entire structure becomes more or less a solid entity.

My long experience at sea in all trades and parts of the world for a quarter of a century has taught me the significance and value of the grainfeeder of my invention herein disclosed, for any shipping company. Important advantages are that there are no more delays and only the initial cost of the parts of which the grainfeeder is made.

Instead of steel, of which the pipes or tubes and the profiles are constructed, I may use aluminum, or magnesium and steel, though at a higher cost.

A grainfeeder has to be "graintight" against leakage, and this is accomplished by my invention as I will hereinafter describe in detail. Very briefly stated, however, I employ some suitable cloth as, for example, burlap, which I interlace from top to bottom of each wall of the grainfeeder, alternately at the front faces and at the rear faces of the boards from top to bottom of each side.

The grainfeeder herein disclosed satisfies the latest rules of the Board of Underwriters at New York as follows, wherein under the heading of "Equivalents" it is stated:

"Where these rules require that a particular fitting, appliance or apparatus or type thereof shall be fitted or carried in a ship, or that any particular provision shall be made, the Board of Underwriters may allow any other fitting, appliance or apparatus or type thereof to be fitted or carried or any other provision to be made if it is satisfied that that other fitting, appliance or apparatus or type thereof or provision is at least as effective as that required by these rules."

In the drawings, wherein is disclosed a single embodiment only, of my invention:

Fig. 1 is a diagrammatic vertical section of a portion of a seagoing ship, showing positioned in hatches thereof two grainfeeders of my invention, each positioned above the hold of the ship, and indicating how, consequent upon rolling of the ship, grain is automatically fed from the grainfeeders into the portion of the hold directly thereunder;

Fig. 2 is a transverse section on a larger scale on the broken line 2—2 of Fig. 1;

Fig. 3 is a vertical front elevation of one of the so-called "profiles" or channeled members at each of the four corners of the grainfeeder;

Fig. 4 is a similar view of one of the so-called "profiles" or channeled members that is or may be located at about midlength of each of two opposite walls of the grainfeeder;

Fig. 5 is a sectional perspective view partly broken away and taken on the line 5—5 of Fig. 3 of one of the profiles located at each of the four corners of the grainfeeder and extending from top to bottom thereof;

Fig. 6 is a sectional perspective view partly broken away and taken on the line 6—6 of Fig. 4, showing the three vertical channels with which such profile is provided to receive ends of certain of the boards constituting certain walls of the grainfeeder;

Fig. 7 is a perspective view of one of the top supports and bottom rests for the two pipes or tubes provided, if desired, at two of the four walls of the grainfeeder that are opposite each other and about at midlength of such opposite walls;

Fig. 8 is a perspective view of the top and bottom support and rest provided at each of the four corners of the grainfeeder for the two pipes or tubes there located;

Fig. 9 is a vertical section upon the line 9—9 of Fig. 2 but upon a larger scale, and showing the boards in position to constitute one of the walls, and the boards constituting the intermediate wall;

Fig. 10 is a front elevation of one of the pipes or tubes provided in pairs at each corner of the grainfeeder, and, if desired, at two opposite faces thereof, at about midlength;

Fig. 11 is a perspective view, broken away, showing several of the boards of one wall in position and with a grain-cloth interlaced at opposite faces of said boards;

Fig. 12 is a detail in transverse section representing the two pipes or tubes and the profile or channel member provided at each of the four corners of the grainfeeder and showing the use of a metal rod passing through the profile and certain of the board ends to hold the parts in position while assembling all the parts of the grainfeeder; and Fig. 13 is a detail in vertical section, broken away, showing a tongue and groove construction of the horizontal edges of the boards that may be employed instead of the graincloth shown in Fig. 11.

Referring more particularly to the drawings wherein is disclosed the preferred embodiment of my invention, and first to Fig. 1 thereof, there is indicated generally at 1 a portion of a seagoing ship, and at 2 and 3 compartments of the hold, and supported in the hatch 4 above the compartment 2 of the hold the grainfeeder of my invention, indicated in its entirety at 5, but merely diagrammatically, and showing therein grain in bulk at 6, and which when—consequent upon the rolling of the ship—space occurs at the top of the mass of grain therein, as indicated merely diagrammatically at 7 and 8, automatically works downward to a greater or less extent so as to tend to fill up the space that has so appeared. At the right of the grainfeeder 5 is diagrammatically represented a grainfeeder 9, supported in or from the hatch 10 by indicating by the height of the grain mass therein that grain has worked down from such grainfeeder 9 into the hold 3, where is the mass of grain 11, and has filled that portion or compartment referred to as the hold 3.

Referring next to Figs. 2–8 and Fig. 10, in Fig. 2 is indicated by the four outer walls 12, 13, 14 and 15, the walls of the hatch 10. At each of the four inner corners of the said hatch 10, near the top thereof and also near the lower edge thereof, and the same construction is provided wherever in the ship a grainfeeder of my invention is located, there is provided a metallic support or rest 16 which may be and desiredly is of steel and which is shaped as best shown in Fig. 8 to provide relatively thin end portions 17, 18, wherein are openings 19, 20 for receiving fastening screws or bolts by which support may be quickly secured in position near the top or upper edge of the grainfeeder and also near the lower edge thereof, and which may also be quickly removed when the time comes to disassemble the grainfeeder. Each of said supports or rests 16 is provided with two through openings 21, 22 for the reception of vertical steel pipes or tubes or rod-like members of any suitable metal, shown at 23 in Fig. 10, and each having preferably removably attached thereto a collar 24 near its lower end, to be attached by set screw or otherwise after the pipe or tube has been inserted through the opening 21 or 22 at an upper corner and lowered toward the similar rest near the lower edge of that same corner.

At each of two opposite walls of the grainfeeder about midway between corners, and at both the upper edge and the lower edge of the grainfeeder, there is provided a support and a rest 25 of steel or other suitable metal, of the same general construction as shown Fig. 7, and of the same general construction as shown in Fig. 8, excepting that the two reduced end portions 26, 27 are in the same plane inasmuch as the said supports and rests 25 are secured each against a single wall of the grainfeeder, as shown in Fig. 2. Each of said supports and rests 25 is provided with the two holes 28, 29 for receiving holding bolts or screws by which the support or rest is secured directly to a single wall of the hatch; each of said supports and rests 25 is provided with two through openings 25a and 25b for two steel pipes or tubes 23.

I term the structure 16 or 25 a "support" when secured near the upper edge of the grainfeeder and a "rest" when secured near the lower edge thereof.

At each of the said four corners of the grainfeeder and, if desired, at about midlength of two opposite walls thereof, there are provided two of the upright, preferably of, steel, pipes or tubes 23 already described with respect to Fig. 10. In the assembling of the parts of the grainfeeder the said upper supports and rests 16 and the supports and rests 25 are secured by bolts or screws in position but so that they can be readily removed as stated. Then, preferably before the appropriate collar 24 has been positioned thereon, each of the said two pipes or tubes is inserted through one of the vertical holes in the upper support 16 or 25 and then the collar 24 is secured in position near the lower end of the pipe or tube, which end is received in the appropriate opening or socket in the appropriate rest 16 or 25. This procedure is carried out with each of the pairs of rods for the grainfeeder at each of the positions described. In between each of the pairs of rods 23, and as best indicated in Fig. 12, there is provided in the case of the four corners of the grainfeeder a so-called "profile" 30, which is desirably of steel that is or may be composed of two members welded or otherwise secured together so as to provide two lengthwise extending channels 31, 32, which as shown in Fig. 12, are at right angles with each other so as to receive in said lengthwise extending channels the ends of the boards of two walls of the grainfeeder when the boards are positioned one above another into the final assembled position shown in Fig. 9. It will be seen that in the case of the profile shown in Fig. 12, the two walls 33, 34 thereof are respectively received against the sides of the rod-like members, pipes or tubes 23, thus holding them in proper position. If desired, I may extend from the wall 33 an angular formation 35, which will also bear against the face of the adjacent rod-like member, pipe or tube 23. In Fig. 12 I have represented at 34a one of the boards in position in channel 32, and having in the end thereof a through hole 34b to receive a short metal rod 34c.

It will be evident from Fig. 12 and also from Fig. 5, wherein the same structure of profile is shown in a sectional perspective, and from Fig. 2, that in the channel 31 are received the ends of boards which are parallel with either of the walls 12 and 14 of the hatch, and that in the channel 32 are received the ends of what are represented in Fig. 2 as shorter boards parallel with the walls 13, 15 of the hatch, and herein later specifically identified.

I may, if desired, provide each profile at its lower end with a special formation for there supporting it or, as shown at the bottom in Fig. 9, and in Fig. 12, I may support the profile at its lower end directly upon the two collars 24 of the two rod-like members 23, or, if desired, a special supporting formation may be provided at the lower end of each profile. In said Figs. 9 and 12 the collars 24 are shown seated on the lower rests 25 secured to the hatch wall where they provide undersupport for the boarding of the grainfeeder as well as for the profiles or upright members 30 and 36.

While in Fig. 12 and also in Fig. 5 the profile 30 is represented as provided with two channels only and which are at right angles to each other, in those cases where I provide means about midlength of two opposite faces of the grainfeeder, I provide two channels as indicated in Fig. 6, wherein the profile as an entirety is shown at 36, and also a third channel, the three channels being respectively shown at 37, 38, 39, the channel 38 being intermediate of and at right angles to the channels 37 and 39 which, as shown, face in opposite directions. The channels 38 of two opposite walls of the grainfeeder, as shown in Fig. 2, receive therein the ends of boards, one of which is shown in position at 40 in Fig. 2. Such profile 36 may be constructed or formed from one piece in any suitable manner or the portions that have the channels 37 and 39 may be welded or otherwise secured to the body portion of the profile which has the channel 38. Also the profile 30 may be formed of a single piece of metal if desired.

Referring further to Fig. 2, one of the boards of the left-hand side of the grainfeeder is indicated at 41 and one of the boards at the right-hand side thereof is indicated at 42. Shorter boards at the other two faces or sides of the grainfeeder are indicated at 43, 44, 45 and 46.

In Fig. 11 I have indicated at 47, 48, 49, 50 four boards of one of the walls of the grainfeeder and at 51 I have represented a "graincloth," desirably of burlap, which is interlaced, as shown, in and out between the said boards, such graincloth being of sufficient extent to be applied to all the boards constituting a wall of the grainfeeder, from end to end of such boards.

If desired, and as a substitute for such cloth, I may provide a tongue and groove construction for the faces of the boards so that they will be so tightly fitted into each other as to prevent the escape of grain between the boards. Such a construction is shown in Fig. 13, wherein two next adjacent boards are indicated at 52 and 53. One of said boards, herein the upper board 52, is provided centrally of the upper edge thereof and along its entire length with an inverted V-shaped groove 54, and the mating board 53 is provided with a longitudinally extending tongue 55 fitting tightly into the groove 54 and extending the entire length thereof. This construction is provided for all the boards, when used as a substitute for the graincloth 51 shown in Fig. 11, and which if used does not interfere with the use of the rods 34c shown in Fig. 12.

In Figs. 3 and 4 I have represented the two profiles 30 and 36 respectively, and the same numerals are applied thereto.

The size and relative dimensions of the grainfeeder of my invention will or may vary, according to the size of the hold or holds of a ship to which a grainfeeder may be applied. Preferably the size is large, the boarding that is preferably employed being used in the full length thereof, which may be twenty, or twenty-five feet, or more, or less. Also the depth or vertical extent of the grainfeeder may and will vary according to the size of the hold wherein it is used and according to the width of the boards employed. They might, for example, have a depth of twenty feet, more or less. This may depend upon requirements of the Board of Underwriters at New York. This means, of course, that the length of the profiles and the pipes or tubes will or may vary.

My invention is not to be limited or restricted by such recitation of dimensions. Also the number of grainfeeders upon a single ship will depend upon the tonnage of the ship. The number upon a single ship may be substantially in excess of two.

Having thus described a single embodiment only of the invention, I desire it to be understood that although specific terms are employed, they are used in a generic sense and not for purposes of limitation, and that the scope of the invention is set forth in the following claims.

I claim:

1. A reusable grainfeeder of general rectangular shape, for ocean-going ships, for the purpose of providing for a stabilized cargo and vessel, whereby the head of material remaining in the chute of the grainfeeder acts to prevent further shifting of the cargo by the flowing of the head of material to fill all free space in the hold during rolling or pitching of the vessel, such reusable grainfeeder comprising readily removable upright members positionable and supported within a hatch of the ship above the lower hold thereof and in horizontally spaced relation, upper support and lower rest means for said upright members attachable to the hatch wall and presenting vertically extending means for positioning said upright members laterally, said upright members having vertical channel formations for receiving the ends of boarding, together with such boarding extending lengthwise and also transversely of the hatch of the ship with the ends of the boarding respectively received in said channel formations of the upright members and with the lowermost boarding receiving bottom support from said lower rest means for the upright members, such boarding thus defining at least the outer walls of the grainfeeder, said such walls being thus composed of a plurality of boards placed edgewise one upon another, all parts of such grainfeeder being readily removable after each using, so that said parts may be stored away for the next use for the same purpose.

2. A reusable grainfeeder for ocean-going ships, in accordance with claim 1, wherein the grainfeeder is provided at each of the four corners at least thereof with two upright, parallel rod-like members in proximity to each other and therebetween and parallel therewith an upright member having two upright channels at an angle to each other, wherein are respectively received the ends of the said boarding.

3. A reusable grainfeeder for ocean-going ships, in accordance with claim 1, wherein the grainfeeder is provided at each of the four corners at least thereof with two upright, parallel rod-like members in proximity to each other and therebetween and parallel therewith an upright member having two upright channels at an angle to each other, wherein are respectively received the ends of the said boarding and wherein removable supports are provided in which the upper and the lower ends of said rod-like members are removably received respectively.

4. A reusable grainfeeder for ocean-going ships, in accordance with claim 1, wherein the grainfeeder is provided at each of the four corners and along two sides thereof about midway between the respective corners, with two upright, parallel rod-like members in proximity to each other and therebetween and parallel therewith, an upright member having two upright channels at substantially right angles to each other to receive therein respectively the ends of said boarding.

5. A reusable grainfeeder for ocean-going ships, in accordance with claim 1, wherein a grain cloth is interlaced along the vertical faces and upper and lower edges of the said boards to render them grain-tight against leakage.

6. A reusable grainfeeder for ocean-going ships, in accordance with claim 1, wherein at each of the four corners at least, of the said grainfeeder, there are provided two upright, parallel steel pipes in proximity to each other and means to secure the upper and the lower ends of such steel pipes securely but readily removably in position.

7. A reusable grainfeeder for ocean-going ships, in accordance with claim 1, wherein at each of the four corners at least, of the said grainfeeder, there are provided two upright, parallel steel pipes in proximity to each other and means to secure the upper and the lower ends of such steel pipes securely but readily removably in position, and wherein between each pair of upright, parallel steel pipes there is positioned an upright steel member having lengthwise extending channels to receive therein the respective ends of the boards extending respectively lengthwise and transversely of the grainfeeder to provide altogether, the sides and the ends of the grainfeeder.

8. A reusable grainfeeder for ocean-going ships, in accordance with claim 1, wherein at each of the four corners at least, of the said grainfeeder, there are provided two upright, parallel steel pipes in proximity to each other and means to secure the upper and the lower ends of such steel pipes securely but readily removably in position, and wherein the means to secure the upper and the lower ends of such steel pipes consists of a lower and an upper metallic block having vertical openings therein to receive the ends respectively of such upright steel pipes.

9. A reusable grainfeeder for ocean-going ships, in accordance with claim 1, wherein the grainfeeder is provided at each of the four corners thereof with two upright, parallel rod-like members in proximity to each other and therebetween and parallel therewith an upright member having two lengthwise extending channels at a right angle to each other, wherein are respectively received the ends of members of the said boarding, the said grainfeeder having at about midlength of each of two opposite walls thereof two upright, parallel rod-like members in proximity to each other and therebetween and parallel therewith an upright member having three longitudinally extending channels angularly arranged with respect to each other, and wherein are received ends of members of said boarding.

10. A reusable grainfeeder for ocean-going ships, in accordance with claim 1, wherein at two opposite walls of the grainfeeder there are provided opposite each other upright means to receive the ends of and to support members of said boarding of a sufficient length to extend from one of said two opposite walls to the other.

11. A reusable grainfeeder for ocean-going ships, in accordance with claim 1, wherein at two opposite walls of the grainfeeder there are provided opposite each other upright means to receive the ends of and to support members of said boarding of a sufficient length to extend from one of said two opposite walls to the other, said opposite upright means at two opposite walls being positioned at about midlength of said two opposite walls.

12. A reusable grainfeeder for ocean-going ships, in accordance with claim 1, wherein at two opposite walls of the grainfeeder there are provided opposite each other upright means to receive the ends of and to support members of said boarding of a sufficient length to extend from one of said two opposite walls to the other, said opposite one of said two opposite walls being positioned at upright means at two opposite walls being positioned at about midlength of said two opposite walls, said opposite upright means at two opposite walls each consisting of two upright, parallel rod-like members in proximity to each other and therebetween and parallel therewith an upright member having therein three upright channels, two of which face in opposite directions and the third of which is located therebetween and faces at right angles to each of the other two channels.

13. A reusable grainfeeder for ocean-going ships, in accordance with claim 1, wherein the grainfeeder is positioned above the hold of the ship, so as automatically to feed grain therefrom into the portion of the hold directly therebeneath, such grainfeeder having four corner stanchions each built up from three pieces, namely, two upright tubes and a profile consisting of a vertically channeled upright beam supported between said two tubes.

14. A reusable grainfeeder for ocean-going ships, in accordance with claim 1, wherein the grainfeeder is positioned above the hold of the ship, so as automatically to feed grain therefrom into the portion of the hold directly therebeneath, such grainfeeder having four corner stanchions each built up from three pieces, namely, two upright tubes and a profile consisting of a vertically channeled upright beam supported between said two tubes, and wherein for each grainfeeder there are provided two center stanchions, each built up from three pieces, namely, two upright tubes and a profile consisting of a vertically channeled upright beam supported between said two tubes.

15. A reusable grainfeeder for ocean-going ships, in accordance with claim 1, wherein the grainfeeder is positioned above the hold of the ship, so as automatically to feed grain therefrom into the portion of the hold directly therebeneath, such grainfeeder having four corner stanchions each built up from three pieces, namely, two upright tubes and a profile consisting of a vertically channeled upright beam supported between said two tubes, and wherein for each grainfeeder there are provided two center stanchions, each built up from three pieces, namely, two upright tubes and a profile consisting of a vertically channeled upright beam supported between said two tubes, and wherein the walls of such grainfeeder are composed of relatively thick boards, one above another, in edgewise position, with their ends received in the channel formations of such profiles.

16. A reusable grainfeeder for ocean-going ships, in accordance with claim 1, wherein the grainfeeder is positioned above the hold of the ship, so as automatically to feed grain therefrom into the portion of the hold directly therebeneath, such grainfeeder having four corner stanchions each built up from three pieces, namely, two upright tubes and a profile consisting of a vertically channeled upright beam supported between said two tubes, and wherein for each grainfeeder there are provided two center stanchions, each built up from three pieces, namely, two upright tubes and a profile consisting of a vertically channeled upright beam supported between said two tubes, and wherein the part of each profile that fits between the tubes to constitute each stanchion is provided with holes therein through each of which a rod is positioned and through holes in the ends of a plurality of said thick boards, to hold the entire structure in place while rigging up the grainfeeder.

17. A reusable grainfeeder for ocean-going ships, in accordance with claim 1, wherein the grainfeeder is positioned above the hold of the ship, so as automatically to feed grain therefrom into the portion of the hold directly therebeneath, such grainfeeder having four corner stanchions each built up from three pieces, namely, two upright tubes and a profile consisting of a vertically channeled upright beam supported between said two tubes, and wherein for each grainfeeder there are provided two center stanchions, each built up from three pieces, namely, two upright tubes and a profile consisting of a vertically channeled upright beam supported between said two tubes, and wherein the part of each profile that fits between the tubes to constitute each stanchion is provided with holes therein through each of which a rod is positioned and through holes in the ends of a plurality of said thick boards, to hold the entire structure in place while rigging up the grainfeeder, each pair of said tubes at their lower ends resting in pairs on a small removable block and being held at their tops by a similar block.

References Cited in the file of this patent

UNITED STATES PATENTS

| Number | Name | Date |
| --- | --- | --- |
| 680,692 | Burrell | Aug. 20, 1901 |
| 1,517,682 | McIntosh | Dec. 2, 1924 |

FOREIGN PATENTS

| Number | Country | Date |
| --- | --- | --- |
| 28,439 | Great Britain | Mar. 17, 1910 |